Figure 1:
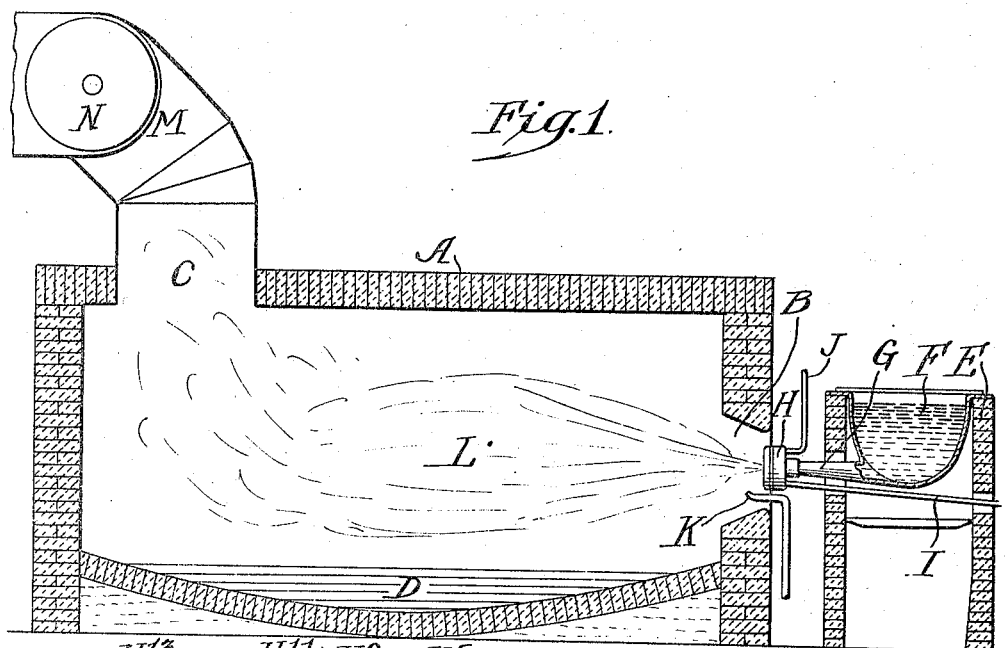

Jan. 27, 1925.   1,524,314
J. A. SCHAEFFER ET AL
METHOD OF MANUFACTURING MORE OR LESS BASIC LEAD SULPHATE
Filed March 20, 1923

Inventors.
John A. Schaeffer,
John H. Calbeck,
and Bernard S. White.
by
their Attorney.

Patented Jan. 27, 1925.

1,524,314

UNITED STATES PATENT OFFICE.

JOHN A. SCHAEFFER, OF ST. LOUIS, AND JOHN H. CALBECK AND BERNARD S. WHITE, OF JOPLIN, MISSOURI, ASSIGNORS TO THE EAGLE-PICHER LEAD COMPANY, OF CINCINNATI, OHIO, A CORPORATION OF OHIO.

METHOD OF MANUFACTURING MORE OR LESS BASIC LEAD SULPHATE.

Application filed March 20, 1923. Serial No. 626,278.

*To all whom it may concern:*

Be it known that we, JOHN A. SCHAEFFER, citizen of the United States of America, and resident of St. Louis, county of St. Louis, State of Missouri, and JOHN H. CALBECK and BERNARD S. WHITE, citizens of the United States of America, and residents of Joplin, county of Jasper, State of Missouri, have invented certain new and useful Improvements in Methods of Manufacturing More or Less Basic Lead Sulphate, of which the following is a true and exact description, reference being had to the accompanying drawings, which form a part thereof.

Our invention relates to the manufacture of finley divided lead sulphate and particularly to the manufacture of basic lead sulphate suitable for use as a pigment and our invention is based on our discovery that atomized metallic lead projected into a highly heated atmosphere containing free oxygen and sulphur dioxide gas in quantity sufficient to react and combine with the lead will be converted into a finely divided basic lead sulphate suitable for use in all respects similar to the pigment widely known as sublimed white lead and our invention, generally speaking, consists in the process of converting atomized metallic lead into a lead sulphate more or less basic; by projecting the atomized lead into a highly heated atmosphere containing oxygen and sulphur dioxide in proportion to produce the desired result. We can and do, by our process, nicely control the proportion of lead sulphate to lead oxide by regulating the proportionate quantity of sulphur dioxide in the furnace atmosphere and, as a certain percentage of zinc oxide is desirable in the pigment, we provide for this by introducing a percentage of zinc into the lead.

Our invention and the best conditions for its practice will be best understood as described in connection with the drawing forming part of this specification, in which—

Figure 2:
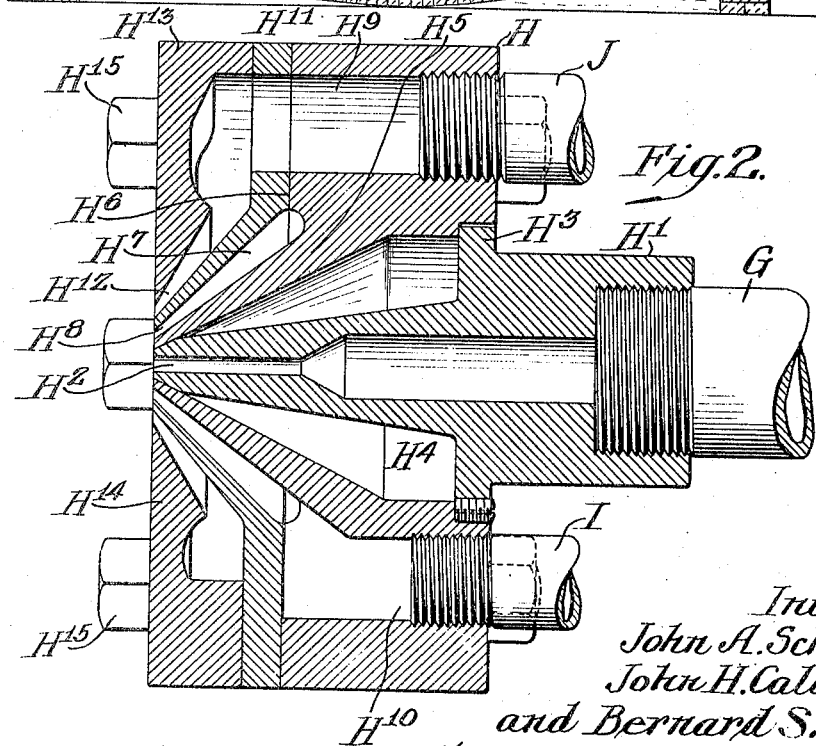

Figure 1 is a longitudinal section through a furnace adapted for use in our process with diagrammatic indications of the accessories, and Figure 2 is a sectional view of a suitable nozzle for atomizing the lead.

A is an elongated furnace having an opening B through which the lead, air, sulphur dioxide and fuel are introduced and an exit opening C, from which leads a conduit M, N indicating a suction fan by which the furnace gases and fumes are drawn from the furnace and forced through cooling settling and screening devices of a well known kind not here indicated. D indicates the bottom of the furnace of basin shape where any unburned lead particles are collected in a lead bath. E is a furnace for heating a lead pot F from which leads a spout G ending in an atomizing nozzle indicated at H. I is an air pipe connected to nozzle H leading through furnace E and from a source of compressed air not shown. J is a gas pipe connected to the nozzle and leading from a source of compressed gas. K is a nozzle through which sulphur dioxide gas is supplied to the furnace. L indicates the elongated flame in which the reactions occur.

The burner or nozzle H, as shown in Fig. 2, is made up of a central lead nozzle $H'$ connected to spout G having an annular flange $H^3$ between which and the end of the nozzle $H^2$ is formed a chamber $H^4$. $H^5$ is the body piece of the nozzle fitting on and secured to the flange $H^3$. This body piece is formed with a flat bearing face $H^6$ beyond which projects the conical extension $H^8$ which contacts with nozzle $H^2$ to form a dead air chamber $H^4$ while a chamber $H^7$ is formed on its outside. A gas port $H^9$ and an air port $H^{10}$ are formed in this body piece. $H^{11}$ is a flat plate resting on the surface $H^6$ of the body piece and having a conical extension $H^{12}$ which encloses the air chamber $H^7$. $H^{13}$ is the cap piece resting on the flat plate $H^{11}$ and having a tapered inwardly extending flange $H^{14}$ forming with cone $H^{12}$ the gas chamber of the nozzle. $H^{15}$, $H^{15}$, are bolts securing the nozzle parts together. This nozzle is of special value in our process and forms the subject matter of the co-pending application filed March 20, 1923, Serial No. 626,253.

In practising our invention, the furnace chamber having been properly heated, atomized lead is blown into the furnace, preferably by air compressed to about forty pounds, and at the same time finely divided fuel, preferably gas, is forced into the furnace in quantity to maintain the necessary high temperature in the furnace and form an elongated flame such as is indicated at L. By the use of the nozzle H the air atomizes the molten lead and the fuel gas mixes at once with the air and atomized lead, so as to initiate at once the elongated flame L in which is also incorporated the sulphur dioxide gas from nozzle K. As a result the finely divided lead is vaporized, oxidized and, at the same time, converted into basic lead sulphate or lead sulphate in quantity proportionate to the sulphur dioxide admitted so that a compound is produced of the composition desired and at a low cost of production.

Having now described our invention, what we claim as new and desire to secure by Letters Patent, is:

1. The method of manufacturing more or less basic lead sulphate, which consists in projecting atomized metallic lead into an atmosphere of air and sulphur dioxide gas in quantity sufficient to react with the lead and produce lead sulphate or basic lead sulphate of the desired composition, and subjecting the mixture of atomized lead suspended in an atmosphere of air and sulphur dioxide gas to heat to insure the reaction of the ingredients and the production of the more or less basic lead sulphate.

2. The method of manufacturing finely divided and more or less basic lead sulphate which consists in projecting a spray of atomized lead into a highly heated furnace having an atmosphere containing free oxygen and sulphur dioxide in quantity to react freely with the atomized lead.

3. The method of manufacturing finely divided and more or less basic lead sulphate which consists in forming a long highly heated oxidizing flame in an elongated furnace chamber by injecting air and finely divided fuel into one end of the furnace through a nozzle, injecting also at the same end of the furnace sulphur dioxide gas in quantity sufficient to react with the lead, and spraying finely divided molten lead into the same end of the furnace and into the flame jet therein.

4. The method of manufacturing finely divided and more or less basic lead sulphate which consists in atomizing molten lead by a jet of high pressure air mixed with finely divided fuel and projected into one end of an elongated furnace so as to form an elongated flame therein, projecting also into the furnace sulphur dioxide gas and regulating the fuel air and sulphur dioxide so as to produce a lead sulphate of the desired composition.

JOHN A. SCHAEFFER.
JOHN H. CALBECK.
BERNARD S. WHITE